United States Patent
Nolte et al.

(10) Patent No.: US 9,517,694 B2
(45) Date of Patent: Dec. 13, 2016

(54) POWER HOP CANCELLATION USING AN ELECTRONIC LIMITED SLIP DIFFERENTIAL

(71) Applicant: GM GLOBAL TECHNOLOGY OPERATIONS LLC, Detroit, MI (US)

(72) Inventors: Jason J. Nolte, Wixom, MI (US); Dejvis Seitllari, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 14/323,885

(22) Filed: Jul. 3, 2014

(65) Prior Publication Data

US 2016/0001654 A1 Jan. 7, 2016

(51) Int. Cl.
*F16H 48/30* (2012.01)
*B60K 23/04* (2006.01)
*B60W 10/12* (2012.01)
*B60W 10/16* (2012.01)
*F16H 48/20* (2012.01)

(52) U.S. Cl.
CPC ............... *B60K 23/04* (2013.01); *F16H 48/30* (2013.01); *B60K 2023/043* (2013.01); *B60K 2023/046* (2013.01); *B60W 10/12* (2013.01); *B60W 10/16* (2013.01); *B60W 2710/12* (2013.01); *F16H 48/20* (2013.01); *F16H 2048/204* (2013.01); *F16H 2048/207* (2013.01); *Y10T 477/606* (2015.01); *Y10T 477/68* (2015.01)

(58) Field of Classification Search
CPC ... B60K 23/04; B60K 2023/043; F16H 48/30; F16H 2048/204; F16H 2048/207; F16H 2048/2074; Y10T 477/68; Y10T 477/606; B60W 2710/12; B60W 10/12; B60W 10/16
USPC .............................. 701/56, 66, 60; 477/115
See application file for complete search history.

(56) References Cited

U.S. PATENT DOCUMENTS

| | | | | |
|---|---|---|---|---|
| 4,679,463 A | * | 7/1987 | Ozaki | B60K 23/04 475/231 |
| 4,874,059 A | * | 10/1989 | Kasegawa | B60K 23/0808 180/197 |
| 5,133,696 A | * | 7/1992 | Kobayashi | B60K 23/04 192/106 F |
| 5,709,627 A | * | 1/1998 | Teraoka | F16H 48/08 184/6.23 |
| 6,038,506 A | * | 3/2000 | Diekhans | B60K 23/04 180/247 |
| 2007/0060437 A1 | * | 3/2007 | Boddy | F16D 29/00 475/149 |

(Continued)

*Primary Examiner* — Roger Pang
(74) *Attorney, Agent, or Firm* — Lorenz & Kopf, LLP

(57) ABSTRACT

Vehicles, systems and a method for mitigating power hop in a vehicle are provided. The vehicle, for example, may include, but is not limited to a drivetrain, an electronic limited slip differential mechanically coupled to the drivetrain, and a controller communicatively coupled to the electronic limited slip differential, wherein the controller is configured to determine when the vehicle is experiencing a power hop event or when the vehicle may experience a future power hop event, and cause, when the vehicle is experiencing the power hop event or when the vehicle may experience the future power hop event, the electronic limited slip differential to apply torque differentiation pulses to the drivetrain.

20 Claims, 2 Drawing Sheets

(56) References Cited

U.S. PATENT DOCUMENTS

2007/0282512 A1* 12/2007 Hoeck .................... B60K 23/04
701/71
2009/0037053 A1* 2/2009 Yamazaki .............. B60K 23/04
701/41

* cited by examiner

US 9,517,694 B2

POWER HOP CANCELLATION USING AN ELECTRONIC LIMITED SLIP DIFFERENTIAL

TECHNICAL FIELD

The technical field generally relates to vehicles, and more particularly relates to systems and methods for reducing power hop in a vehicle.

BACKGROUND

Power hop is a phenomenon which may be experienced by a vehicle during acceleration. Power hop generally occurs during a quick acceleration maneuver from either a stop or a slow speed which causes a driveline of a vehicle to twist. The twist of the driveline causes the vehicle to shake and shutter as the components of the driveline react against each other and ground. Traditional control systems correct for power hop by cutting the torque produced by the engine, which slows down the vehicle. Accordingly, a system and method for reducing power hop which doesn't cut engine power is desirable.

SUMMARY

In one embodiment a vehicle is provided. The vehicle may include, but is not limited to a drivetrain, an electronic limited slip differential mechanically coupled to the drivetrain, and a controller communicatively coupled to the electronic limited slip differential, wherein the controller is configured to determine when the vehicle is experiencing a power hop event or when the vehicle may experience a future power hop event, and cause, when the vehicle is experiencing the power hop event or when the vehicle may experience the future power hop event, the electronic limited slip differential to apply torque differentiation pulses to the drivetrain A method is provided for mitigating power hop in a vehicle. The method may include, but is not limited to determining, by a controller, when the vehicle is experiencing a power hop event or when the vehicle may experience a future power hop event, and causing, by the controller, an electronic limited slip differential to apply torque differentiation pulses to a drivetrain of the vehicle when the vehicle is experiencing the power hop event or when the vehicle may experience the future power hop event.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, power hop can affect a vehicle during acceleration. As discussed in further detail below, an electronic limited slip differential, and a method for controlling an electronic limited slip differential are provided for preventing and/or mitigating power hop in a vehicle. The system described herein controls power hop in a vehicle without cutting engine power or applying the brakes of the vehicle, thereby improving the performance of the vehicle.

Figure 1:
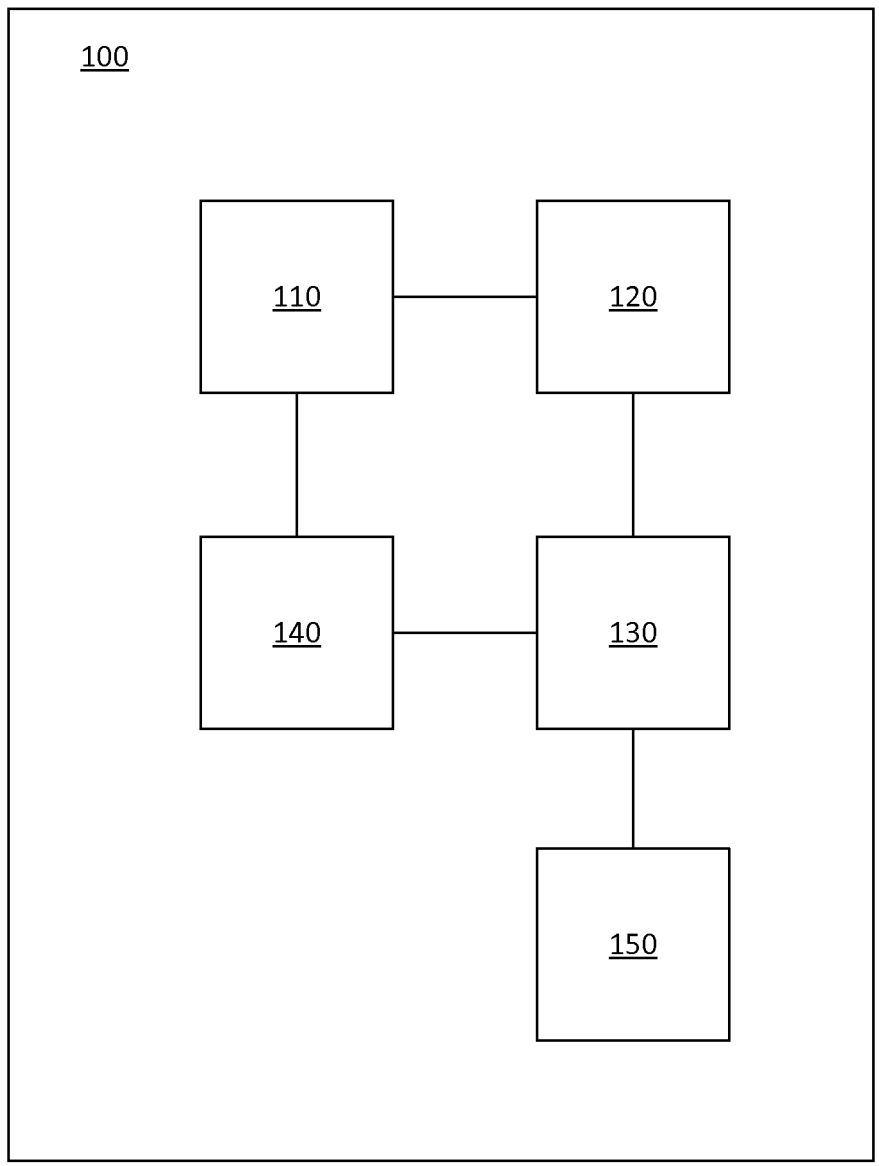
FIG. 1 is a block diagram of a vehicle, in accordance with an embodiment.

FIG. 1 is a block diagram of a vehicle 100, in accordance with an embodiment. In one embodiment, for example, the vehicle 100 may be an automobile. However, one of ordinary skill in the art would recognize that the systems and methods discussed herein could apply to any vehicle or other system which includes a differential, an all-wheel drive system and/or power transfer units. The vehicle 100 includes a drivetrain 110. Components of the drivetrain 110 may vary based upon a vehicle type. The vehicle type may include, but is not limited to, a manual transmission, an automatic transmission, front-wheel drive, rear-wheel drive, four-wheel drive, hybrid vehicles, electric vehicles, or a combination thereof. In general, the drivetrain 110 may include one or more engines, a clutch, a gearbox, an overdrive, a propeller shaft, a front axle, a rear axle, a transaxle, a final drive, a differential, a torque converter, a transmission, drive shafts, constant-velocity joints, a transfer box, a transmission brake, a locking differential, a portal gear, a power transfer unit, and/or an active suspension dampening system.

The vehicle 100 further includes an electronic limited slip differential (eLSD) 120. The eLSD 120 generally functions to maintain traction in off-road or slippery conditions, such as rain, snow or ice. In a standard open differential (i.e., a vehicle without any type of limited slip differential), a wheel which is slipping due to the road or off-road conditions (e.g., a wheel not in contact with the ground, slipping in dirt, sand, etc.) receives the majority of the power from the engine, while a wheel which is still in contact with the road (i.e., still has traction) will remain stationary. Limited slip differentials, including eLSD systems, prevent excess power from being allocated to the slipping wheel, thereby keeping both wheels in powered rotation. In one embodiment, for example, the eLSD 120 may include a planetary or bevel gear set and a clutch pack (not illustrated). However, one of ordinary skill in the art would recognize that the eLSD 120 may be configured in a variety of ways. As discussed in further detail below, the eLSD 120 in the vehicle 100 is also used to reduce power hop.

The vehicle 100 further includes a controller 130. In one embodiment, for example, the controller 130 may be a processor such as a central processing unit (CPU), a physics processing unit (PPU), a microcontroller, an application specific integrated circuit (ASIC), a field programmable logic array (FPGA), or any other logic device or any combination thereof. The controller 130 may be dedicated to the system for reducing power hop, or may be shared by one or more other systems in the vehicle 100.

The vehicle 100 further includes one or more sensors 140. The sensor(s) 140 may include, for example, tire sensors (temperature, pressure, wear monitoring, etc.), wheel speed sensors, vibration sensors, accelerometers, engine sensors (e.g., engine torque sensor, revolutions per minute (RPM) sensors, etc.), transmission sensors, pedal position sensors, environment sensors (temperature rain, snow, etc.), eLSD sensors (temperature, pressure, etc.), suspension sensors (position, rate, viscosity, etc.), and/or road condition sensors. The sensor(s) 140 are configured to output their respective data to the controller 130. As discussed in further detail below, the controller 130 utilizes the data from the sensor(s) 140 to reduce power hop in the vehicle 100.

The vehicle 100 further includes at least one memory 150. The memory 150 may be any type of non-volatile memory. The memory 150 is communicatively coupled to the controller 130 of the vehicle 100. As discussed in further detail below, the memory 150 stores one or more waveforms which the controller uses to mitigate power hop in the vehicle 100.

Figure 2:
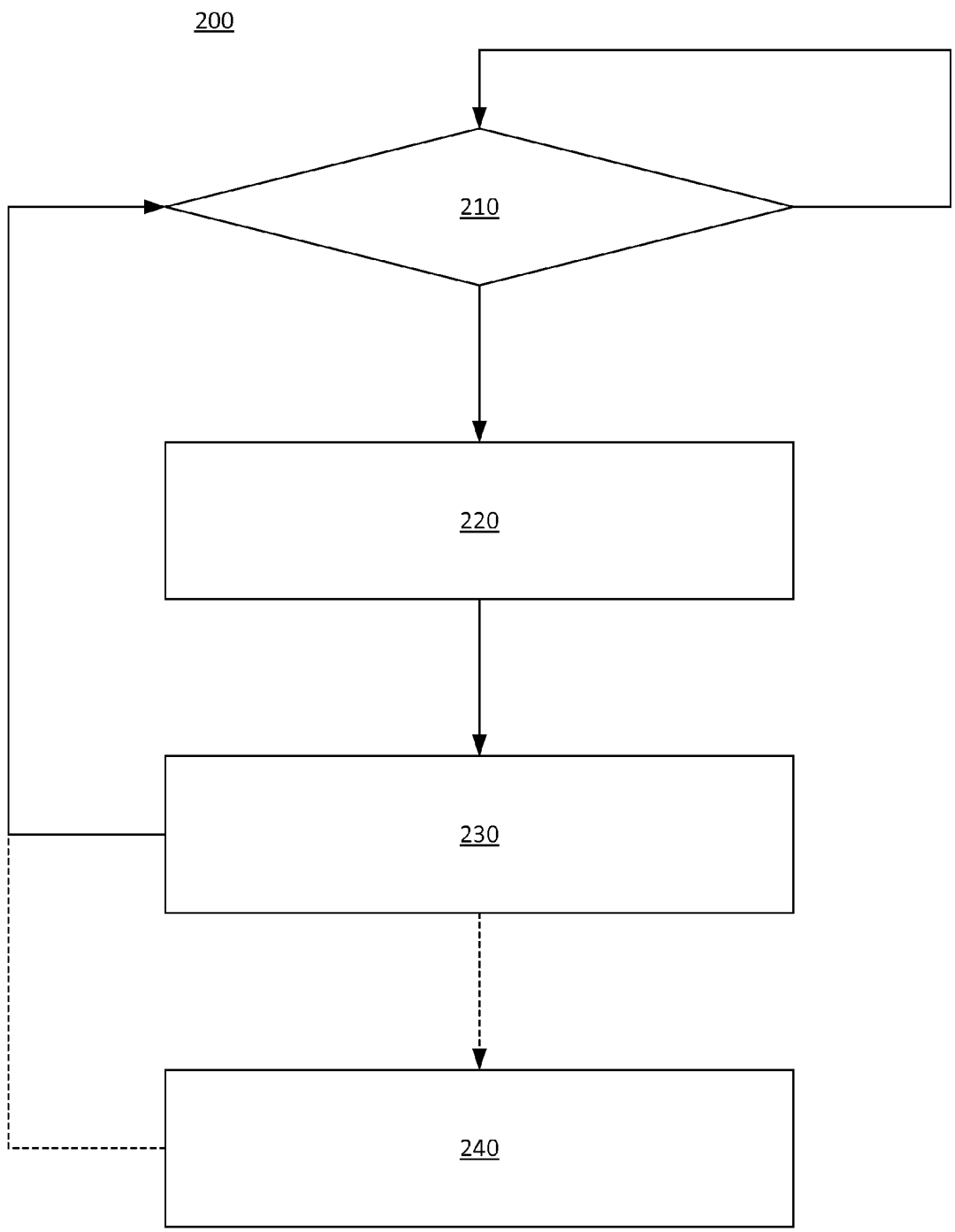
FIG. 2 is a flow diagram illustrating a method for mitigating power hop utilizing an eLSD, in accordance with an embodiment.

FIG. 2 is a flow diagram illustrating a method 200 for mitigating power hop utilizing an eLSD 120, in accordance with an embodiment. The controller 130 first determines if the vehicle 100 is currently experiencing power hop or may experience power hop in the near future. (Step 210). The controller 130, for example, may determine that the vehicle is currently experiencing power hop based upon data from one or more of the sensors 140. In one embodiment, for example, the controller 130 may determine that the vehicle 100 is experiencing power hop if data from an accelerometer indicates that the vehicle 100 is shuttering and/or if an engine torque sensor indicates that the engine torque level is fluttering.

In one embodiment, for example, the determination that the vehicle 100 may experience power hop may be based upon multiple factors. The controller 130, for example, may analyze data from one or more of the sensors 140 to make the determination. As discussed above, power hop generally occurs when a vehicle is quickly accelerating from a stop or from a low speed. Accordingly, a factor in the determination may be a speed of the vehicle 100. If, for example, data from a sensor 140 indicates that the vehicle is stopped or below a predetermined speed, the controller 130 may determine that the vehicle 100 may experience power hop. The predetermined speed may vary from vehicle to vehicle as each vehicle may be susceptible to power hop under different conditions.

Another factor in the determination may be the engine RPM of the vehicle 100. If the engine RPM is above a predetermined threshold, the controller 130 may determine that the vehicle 100 may soon be accelerating quickly, and, thus, experience power hop. The engine RPM may be considered in conjunction with the speed of the vehicle 100 in the determination. If the vehicle speed is high, a high engine RPM would not necessarily cause power hop. In contrast, if the vehicle speed is low, or the vehicle is stopped, a high engine RPM may indicate that the vehicle 100 may experience power hop.

Other factors that may be considered in the determination include steering position, transmission gear selection, accelerator pedal position, driven wheel speed, and/or road condition data (e.g., rain, ice, snow, dirt, gravel, etc.). In an automatic transmission vehicle which includes a launch control, the determination may simply be whether or not launch control has been activated.

If the vehicle 100 is not experiencing power hop or the controller is not expecting the vehicle 100 to experience power hop, the controller 130 continues to monitor the vehicle 100.

If the vehicle 100 is experiencing power hop or the controller 130 determines that the vehicle 100 may experience power hop based upon one or more of the factors, the controller utilizes the eLSD 120 of the vehicle to reduce the existing power hop and/or utilize the eLSD 120 to prevent the power hop from developing. (Step 220). The controller 130 causes the eLSD 120 to apply pressure pulses to the drivetrain 110 resulting in torque differentiation pulses to the drivetrain 110 of the vehicle 100 when torque is applied from the powertrain of the vehicle 110. In one embodiment, for example, the eLSD adjusts a pressure on the clutch pack or other resistance system that enables torque differentiation. In other words, the eLSD can pulse torque differentiation amounts from one side of the drivetrain to the other to disrupt the power hop event. In particular, the eLSD 120 may apply the torque differentiation pulses to a driveshaft of the drivetrain 110 of the vehicle 100. As discussed above, power hop may be caused by a twisting of the driveline. By applying the torque differentiation pulses directly to the driveshaft to counteract power hop, the method and systems discussed herein addresses the problem at the source rather than simply forcing the car to slow down. Furthermore, by applying torque differentiation pulses from the eLSD 120 to a driveshaft of the vehicle to prevent and/or mitigate power hop, the vehicle 100 can more efficiently provide power to the wheels, allowing the vehicle 100 to accelerate more quickly.

Different vehicles may be subject to a varying amount of power hop. In other words, the frequency and amplitude of power hop can vary from vehicle to vehicle and powertrain to powertrain. A truck, for example, may be subject to different power hop characteristics than a sports car. Furthermore, the frequency and amplitude of a power hop event can vary depending upon the state and position of the vehicle. In other words, the driven wheel speed of the vehicle, the state of the tires of the vehicle, the speed of the vehicle and the road conditions can affect the frequency and amplitude of a power hop event. Likewise, an expected amount of power hop before the power hop event begins may depend upon the speed of the vehicle 100, the steering position, the selected gear, an accelerator pedal position and/or the RPM of the engine of the vehicle 100.

In one embodiment, for example, the torque differentiation pulses may correspond to a pre-programed waveform stored in the memory 150. The memory 150 may store numerous waveforms, each waveform corresponding to a range of one or more conditions (e.g., RPM ranges, time state ranges, vehicle speed ranges, etc.). In one embodiment, for example, the pre-programed waveform may be determined experimentally by the vehicle manufacturer and stored in the memory 150. The controller 130, based upon the data from the sensors 140, determines which waveform most closely corresponds to the conditions of the vehicle 100 and applies the waveform to the drivetrain 110 using the eLSD 120. However, as discussed in further detail below, a frequency and amplitude of the stored waveforms may be dynamically adjusted based upon the driving conditions.

The torque differentiation pulses applied by the eLSD cancel out the power hop by applying a force to the drivetrain 110 which is substantially opposite of the force being caused by the power hop event. However, in order to effectively disrupt the power hop event, the phase of the waveform causing the torque differentiation pulses should be substantially out of phase with a phase of the power hop event. If a phase of the waveform causing the torque differentiation pulses is aligned with the power hop event, the torque differentiation pulses could actually amplify the power hop event. Accordingly, in one embodiment, for example, the controller 130 may monitor data from one of the sensors 140, for example an accelerometer, to determine a phase of the power hop event. Based upon the phase of the power hop event, the controller 130 can determine when to initiate the torque differentiation pulses, the frequency of the torque differentiation pulses, and the amplitude of the torque differentiation pulses to most effectively cancel out the power hop event. The controller 130 starts the torque differentiation pulses from the eLSD 120 after one torque wave cycle of the power hop event. In another embodiment, for example, the controller 130 may initiate the torque differentiation pulses from the eLSD 120 before the power hop event begins in an effort to cancel out the power hop event before it begins.

After the first cycle of the waveform corresponding to the torque differentiation pulses, the controller 130 then tunes the torque differentiation pulses based upon data corresponding to the actual power hop event. (Step 230). The controller 130 begins to monitor the drivetrain 110 of the vehicle 100 for any indication of power hop via the one or more sensors 140. The controller 130, if a power hop event is detected, may then determine a phase, frequency and amplitude of the power hop event and modify the original pre-programed waveform therefrom. In one embodiment, for example, the amplitude of the waveform may be modified according to: New Amplitude=(Measured Amplitude−Current Amplitude−$Cal_1$)*$Cal_2$+Current Amplitude, where the New Amplitude is the new amplitude of the waveform causing the torque differentiation pulses from the eLSD 120, the Measured Amplitude is the amplitude of the power hop event measured by the one or more sensors 140, and $Cal_1$ and $Cal_2$ are calibration parameters which take into account system latencies. $Cal_1$ and $Cal_2$ may be based upon the speed of the controller 130 as well as any latency involved in receiving data from the sensors 140.

In one embodiment, for example, the frequency of the waveform may be modified according to: New Frequency=(Measured Frequency−Current Frequency−$Cal_1$)*$Cal_2$+Current Frequency, where the New Frequency is the new frequency of the waveform causing the torque differentiation pulses from the eLSD 120, the Measured Frequency is the frequency of the power hop event measured by the one or more sensors 140, and $Cal_1$ and $Cal_2$ are calibration parameters which take into account system latencies. As discussed above, $Cal_1$ and $Cal_2$ may be based upon the speed of the controller 130 as well as any latency involved in receiving data from the sensors 140.

As noted above, a phase of the waveform causing the torque differentiation pulses should substantially misalign with the phase of the power hop event to effectively cancel out the power hop event. In one embodiment, for example, a phase shift to realign the phase of the waveform may be determined according to: Phase Shift=(System Peak Time−Waveform Peak Time+Latency−$Cal_1$), where Phase Shift is an time corresponding to a change in the waveform to misalign the waveform with the power hop event, System Peak Time is a time corresponding to a peak torque or acceleration of the power hop event, Waveform Peak Time is a time corresponding to a peak of the current waveform, Latency is a delay in measuring the System Peak Time relative to the actual Peak time, and $Cal_1$ corresponds to a parameter which take into account system latencies in implementing the phase shift modification to the current waveform. In one embodiment, for example, the controller 130 may modify the waveform every cycle of the algorithm. However, the waveform may be updated at any rate.

In one embodiment, for example, the controller 130 may continue to update the waveform and provide the torque differentiation pulses to the drive train 110 via the eLSD 120 until data from the sensors 140 indicates that the power hop event is over. In this embodiment, for example, the controller 130 may terminate the torque differentiation pulses when a measured amplitude of the power hop event is below a predetermined threshold. In one embodiment, for example, the controller may terminate the torque differentiation pulses when the amplitude of the power hop event is less than $Cal_1$ for $Cal_2$ number of samples/time. In another embodiment, for example, the controller may end the torque differentiation pulses after a predetermined time. The time limit may be a fail-safe to add assurance that the eLSD 120 stops modifying the torque delivered by the engine in case of, for example, a sensor malfunction.

In one embodiment, for example, after the torque differentiation pulses from the eLSD 120 have been terminated by the controller 130, the processes returns to Step 210 where the controller 130 determines if another power hop event is forthcoming. In certain circumstances, however, the controller 130 may also modify one or more of the pre-programed waveforms prior to returning to Step 210. (Step 240). Data from one or more of the sensors 140 may indicate a change in torque application to ground, including changes to a propshaft, halfshaft, chip reprogramming, addition of after-market components, new wheels and/or new tires. The changes in the driveline stiffness may cause the controller 130 to alter one or more of the pre-programmed waveforms to more accurately reflect initial power hop characteristics as experienced by the vehicle. In other words, the controller 130 may modify an amplitude and/or frequency of the stored waveforms as the components of the vehicle age to more accurately compensate for the power hop being experienced by the vehicle.

While at least one exemplary embodiment for a vehicle has been presented in the foregoing detailed description, one of ordinary skill in the art would recognize that the power hop mitigating methods and features described herein may be applied to any system which may be subject to power hop. Furthermore, the systems and methods for mitigating power hop discussed herein could be incorporated into vehicles or other systems which mitigate power hop in other manners, such as through reducing engine output, applying brakes, and/or through computer controlled shocks.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   a drivetrain;
   an electronic limited slip differential mechanically coupled to the drivetrain; and
   a controller communicatively coupled to the electronic limited slip differential, wherein the controller is configured to:
   determine when the vehicle is experiencing a power hop event or when the vehicle may experience a future power hop event when a speed of the vehicle is below a first predetermined threshold and a revolutions-per-minute of an engine of the vehicle is above a second predetermined threshold, the power hop event and the further power hop event including a twisting of at least a portion of a driveline of the vehicle; and cause, when the vehicle is experiencing the power hop event or when the vehicle may experience the future power hop event, the electronic limited slip differential to create torque differentiation pulses on the drivetrain.

2. The vehicle of claim 1, further comprising:
at least one sensor communicatively coupled to the controller,
wherein the controller is further configured to determine when the vehicle is experiencing the power hop event or when the vehicle may experience the future power hop event based upon data from the at least one sensor.

3. The vehicle of claim 2, wherein the data includes a speed of the vehicle and a revolutions per minute of an engine of the vehicle.

4. The vehicle of claim 2, wherein the controller is configured to modify the torque differentiation pulses applied by the electronic limited slip differential based upon the data from the at least one sensor.

5. The vehicle of claim 4, wherein the controller modifies at least one of an amplitude, frequency and phase of the torque differentiation pulses.

6. The vehicle of claim 1, further comprising:
a memory communicatively coupled to the controller, wherein the memory is configured to store a waveform,
wherein the controller is further configured to cause the electronic limited slip differential to create torque differentiation pulses on the drivetrain based upon the waveform.

7. The vehicle of claim 6, further comprising:
at least one sensor communicatively coupled to the controller,
wherein the controller is further configured to modify the waveform based upon data from the at least one sensor.

8. A method for mitigating power hop in a vehicle, comprising:
determining, by a controller, when the vehicle is experiencing a power hop event or when the vehicle may experience a future power hop event when a speed of the vehicle is below a first predetermined threshold and a revolutions-pre-minute of an engine of the vehicle is above a second predetermined threshold, the power hop event and the future power hop event including a twisting of at least a portion of a driveline of the vehicle; and
causing, by the controller, an electronic limited slip differential to cause torque differentiation pulses on a drivetrain of the vehicle when the vehicle is experiencing the power hop event or when the vehicle may experience the future power hop event.

9. The method of claim 8, wherein the determining further comprises:
receiving, by the controller, data from at least one sensor; and
determining, by the controller, when the vehicle is experiencing a power hop event or when the vehicle may experience a future power hop event based upon the data from the at least one sensor.

10. The method of claim 9, wherein the data includes at least a speed of the vehicle and a revolutions per minute of an engine of the vehicle.

11. The method of claim 8, wherein the causing further comprises:
receiving, by the controller, data from at least one sensor;
determining, by the controller, a state of the vehicle based upon the data from the at least one sensor; and
determining, by the processor, a waveform corresponding to the torque differentiation pulses to apply to the drivetrain of the vehicle.

12. The method of claim 11, further comprising:
modifying by the processor, the waveform based upon an amplitude, frequency and phase of the power hop event.

13. The method of claim 8, further comprising:
causing, by the electronic limited slip differential, torque differentiation pulses on the drivetrain of the vehicle for a predetermined period of time.

14. The method of claim 8, further comprising:
causing, by the electronic limited slip differential, torque differentiation pulses on the drivetrain of the vehicle while an amplitude of the power hop event is greater than a predetermined threshold.

15. A system, comprising:
a drivetrain;
an electronic limited slip differential mechanically coupled to the drivetrain; and
a controller communicatively coupled to the electronic limited slip differential, the controller configured to:
determine when the system is experiencing a power hop event or when the system may experience a future power hop event when a speed of the system is below a first predetermined threshold and a revolutions-per-minute of an engine of the system is above a second predetermined threshold, the power hop event and the further power hope event including a twisting of at least a portion of a driveline of the system; and
cause, when the system is experiencing the power hop event or when the system may experience the future power hop event, the electronic limited slip differential to create torque differentiation pulses on the drivetrain.

16. The system of claim 15, further comprising:
at least one sensor communicatively coupled to the controller,
wherein the controller is further configured to determine when the system is experiencing the power hop event or when the system may experience the future power hop event based upon data from the at least one sensor.

17. The system of claim 16, wherein the controller is configured to modify the torque differentiation pulses created by the electronic limited slip differential based upon the data from the at least one sensor.

18. The system of claim 17, wherein the controller modifies at least one of an amplitude, frequency and phase of the torque differentiation pulses.

19. The system of claim 15, further comprising:
a memory communicatively coupled to the controller, wherein the memory is configured to store waveform,
wherein the controller is further configured to cause the electronic limited slip differential to create torque differentiation pulses on the drivetrain based upon the waveform.

20. The system of claim 19, further comprising:
at least one sensor communicatively coupled to the controller,
wherein the controller is further configured to modify one of the at least one waveform based upon data from the at least one sensor.

* * * * *